MAGNETIC THIN FILM ADAPTIVE ELEMENT

Filed Dec. 31, 1964 3 Sheets-Sheet 1

Richard P. Abraham
Leonce J. Sevin
INVENTORS

BY John D. Graham

Richard P. Abraham
Leonce J. Sevin
INVENTORS

BY John G. Graham

MAGNETIC THIN FILM ADAPTIVE ELEMENT

Filed Dec. 31, 1964 3 Sheets-Sheet 3

Richard P. Abraham
Leonce J. Sevin
INVENTORS

BY John D. Graham

United States Patent Office 3,460,106
Patented Aug. 5, 1969

3,460,106

MAGNETIC THIN FILM ADAPTIVE ELEMENT

Richard P. Abraham, Dallas, and Leonce J. Sevin, Richardson, Tex., assignors to Texas Instruments Incorporated, Dallas, Tex., a corporation of Delaware Filed Dec. 31, 1964, Ser. No. 422,814
Int. Cl. G11b *5/66;* H01f *10/04, 10/06*
U.S. Cl. 340—174 3 Claims

ABSTRACT OF THE DISCLOSURE

Disclosed herein are two improved trainable decision systems, each utilizing magnetic thin film adaptive memory elements in an adaptive array. The two adaptive memory systems herein shown each comprise an array of thin films having magnetic fields exhibiting anisotropy, a means of applying a direct current voltage source in the easy axis direction of the film, and a means of applying an alternating current voltage source in the hard axis direction to control the movement of the domain walls, said movement being indicative of the adaptation process.

The present invention relates to trainable decision systems which are also known as self-organizing systems, learning machines or adaptive systems, and more particularly, but not by way of limitations, relates to such a system employing an improved adaptive element.

Adaptive decision systems have been extensively explored during the past several years. The most notable systems to date include the Adaline and Madaline systems at Stanford Electronic Laboratory, the Perceptron at Cornell Aeronautical Laboratories, and the Minos I and II at Stanford Research Institute. The heart of these adaptive systems is an adaptive component which produces an analog weight factor dependent upon the system's previous experience and training program. In its simplest form, the adaptive component is merely a resistance, the value of which may be selectively increased or decreased by an analog quantity and the value of which may be read out without materially changing the value of the resistance.

In all trainable decision systems the accuracy with which decisions can be made and the usefulness of the machine both increase with the number of adaptive components which are employed. Therefore, the availability of an adaptive element having a low unit cost is an overriding consideration in the design and application of all trainable systems. The adaptive elements heretofore available have, in general, been too large and too expensive for application in other than an experimental systems or other systems requiring only a relatively low number of components. Mechanically variable resistors are, of course, impractical except for basic research work. Electromechanically variable resistors are too large and expensive to be practical. Thermistors have been suggested but have serious drawbacks in terms of value retention period and the type of signals available. Photochromic films have been successfully used for two-layer processing of visual data, but do not appear to be adaptable to more complicated topologies and have a short retention period. Simple systems using capacitors as charge integrators are inherently very slow in operation, and when sufficient circuitry is used to speed up operation, the system becomes too complex and expensive. Chemical devices which employ a reversible electrochemical reaction or a reversible electroplating reaction have been used but are too expensive. Thus the available adaptive components are quite cumbersome and expensive and cannot be, as a practical matter, used in a system having a large number of adaptive elements.

The present invention contemplates an improved trainable decision system utilizing adaptive elements which may be fabricated using thin magnetic film techniques in an adaptive array. The adaptive elements have magnetic properties which may be varied by applying external electric fields to the elements. More specifically, the adaptive memory system may comprise an array of thin films having magnetic fields exhibiting anisotropy, a means of applying a direct current voltage source in the easy axis direction of the film, and a means of applying an alternating current voltage source in the hard axis direction of the film to control the movement of the domain walls in the film, the movement of the walls being indicative of the adaption process.

It is therefore a primary objective of the present invention to provide an economical trainable decision system having a large number of adaptive memory elements.

Another object is to provide an inexpensive adaptive memory element for a trainable decision system.

A further object is to provide an adaptive memory element which is very small and which can be fabricated using thin magnetic film techniques in an array of a large number of such elements.

Other objects and advantages of the invention will be obvious to those skilled in the art from the following detailed description and drawings wherein.

Figure 3:
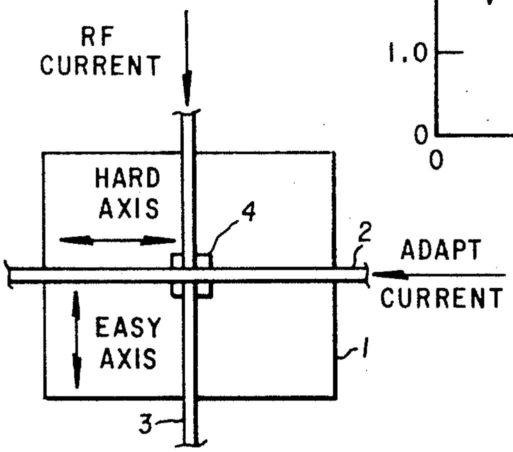
FIGURE 3 illustrates a single thin film with means for carrying out the invention.

With reference to FIGURE 3, a magnetic thin film adaptive element is illustrated which operates according to the principles of this invention. Only one element is illustrated here, although of course many such elements would be ordinarily utilized in an integrated array as will be discussed below. This element is formed on an insulating substrate 1, composed of glass for example, and the element includes a thin deposited ferromagnetic film bit 4 composed of Permalloy, a nickel-iron alloy, or other material exhibiting uniaxial anisotropy. The film may be perhaps 10,000 A. thick, and about 50 x 80 mils in area. Two mutually perpendicular strip-line conductors 2 and 3 cross over the bit 4, these being electrically insulated from one another and composed of conductive but non-magnetic material which may be deposited as films with interleaved insulating material. The conductor 3 carries an A–C (RF) exciting current, at 5 mc. for example, which produces an alternating magnetic field $H_{ac}$ in a direction perpendicular to the easy axis of the film bit 4. The conductor 2 is aligned parallel to the hard axis of the film bit 4 and carries a D–C adapt current, producing a field $H_{dc}$ parallel to the easy axis. This conductor also serves as the output line, a second harmonic of the A–C excitation appearing on the conductor 2 as will be explained below.

Figure 1:
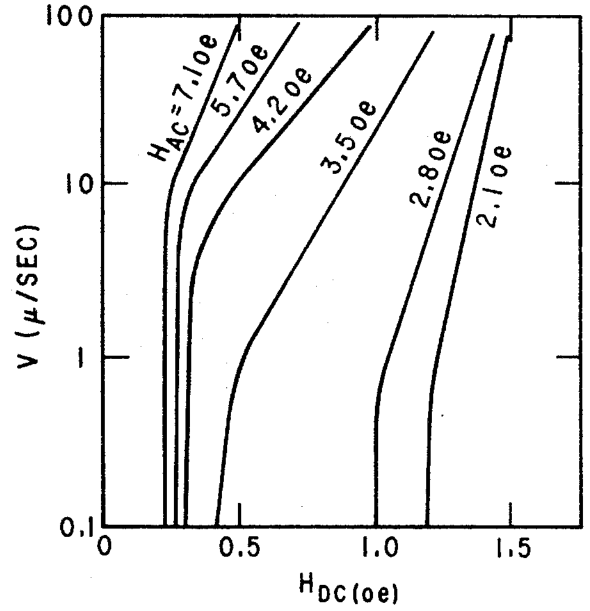
FIGURE 1 is a representative graph of the creep velocity of the domain walls versus applied orthogonal alternating current and direct current fields applied to the easy axis of a thin magnetic film.
Figure 2:
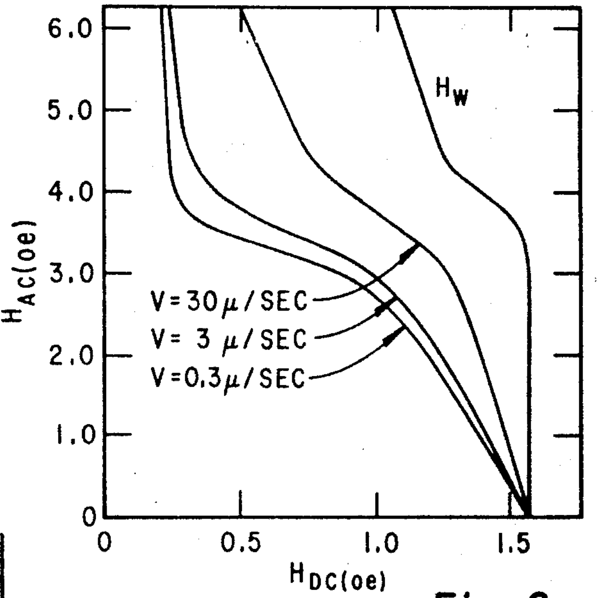
FIGURE 2 is a representative graph of constant creep velocities of the domain walls with the alternating current fields being plotted versus the direct current fields applied to the easy axis of a thin magnetic film.

With reference to FIGURE 1, a representative graph illustrates a family of curves of the direct current field, $H_{dc}$, measured in oersteds, applied to the easy axis of the thin magnetic film having uniaxial anisotropy characteristics (as seen in FIGURE 1), versus the domain wall velocity in the film, with the alternating current field, $H_{ac}$, measured in oersteds, applied to the hard direction of the film as a running parameter. FIGURE 2 illustrates a variation of FIGURE 1, having the direct current field, $H_{dc}$, plotted versus the alternating current field, $H_{ac}$, with the resultant family of constant domain wall velocities. These curves reveal regions of excellent proportionality for various combinations of $H_{ac}$ and $H_{dc}$.

The operation of the device of this invention is based on the predictable velocity of domain walls in the film, and the concomitant control of the net magnetization of the film. It has been found that when a direct current field, $H_{dc}$, smaller than the domain wall coercive force $Hw$ is applied in the easy direction of a thin magnetic film, an alternating current field, $H_{ac}$, applied in the hard direction of the film will cause the domain walls of the film to move slowly or "creep" in the direction of the applied easy direction field. This control of the movement of the domain walls results in M, the net magnetization of the film, being dependent, i.e., can be increased or decreased, upon the direction of the easy-axis field. When the direct current field, $H_{dc}$, is removed, the creep velocity theoretically drops to zero, leaving M independent of time. Thus it is seen that the thin magnetic film of FIGURE 3 can be adapted, and the use of several of these films in the manner described results in an adaptive trainable system.

Figure 4:
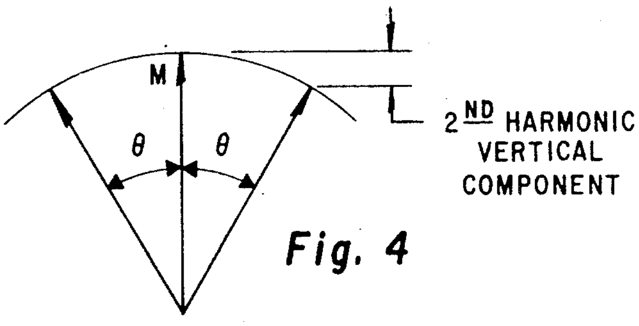
FIGURE 4 illustrates a vector diagram of the effect of partial rotation of the magnetization vector M.

The vector diagram of FIGURE 4 illustrates how a partial rotation of the magnetization vector M through an angle $\theta$, due to the alternating current field following the hard direction of the film, produces a component of flux perpendicular to the direct current (adapt current) line which also lies in the hard direction of the film. The magnitude of this flux is obviously a function of the length of the vector M. To a first approximation, the output voltage due to this flux component is given by:

$$e_0 = \tfrac{1}{2} A\omega M[Hx/Hk]^2 \sin 2\omega t$$

where:

A=the cross-sectional area of the thin film which is perpendicular to the surface of the film and parallel to the easy axis
$\omega$=Angular frequency
M=Film magnetization
$Hx$=Peak value of the alternating current field
$Hk$=Anisotropy field Thus, the output voltage is directly proportional to M and is the second harmonic of the alternating current input.

One method (not illustrated) of conducting the test is as follows:

A five megacycle alternating current is applied to the conductor 3 from a General Radio 1211–B oscillator with approximately twenty percent of one kilocycle modulation. The output voltage, as detected from conductor 2, is monitored with a Hallicrafter SX–62 A receiver, with the one kilocycle output displayed on a Hewlett-Packard 400H audio VTVM and also on an oscilloscope. Single direct current (adapt current) pulses are obtained from a Rutherford B7 pulse generator with a manual external trigger. The adapt current pulses are fed in one at a time, after which the output voltage is read. The time lapse after each adapt pulse should be around two or three seconds, or enough time to read and record the output voltage.

Figure 5:
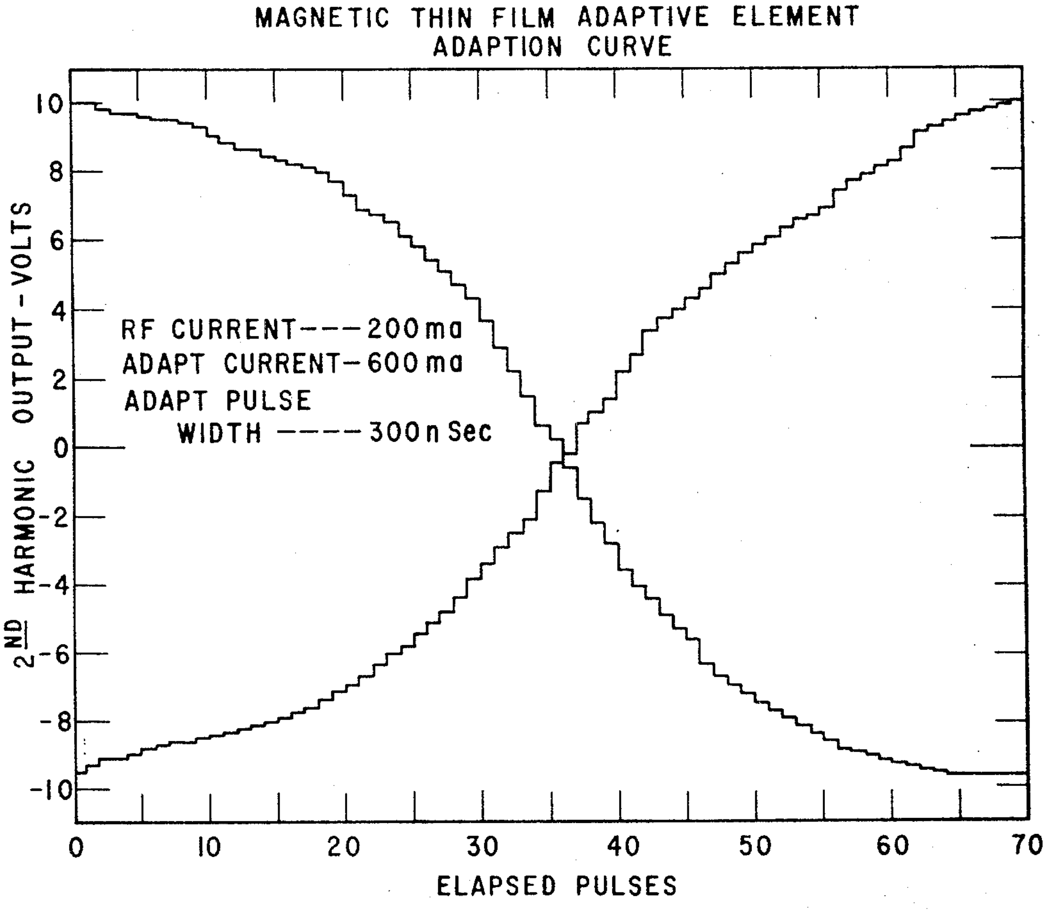
FIGURE 5 illustrates representative test data.

FIGURE 5 illustrates some representative data from the afore-mentioned test method. The output voltage as measured on the conductor 2 is plotted versus the cumulative number of adapt pulses. The graph is shown in discrete steps rather than as a smooth curve to indicate the discrete nature of the test. The adaption characteristics show a fair amount of linearity between the limits of plus and minus five volts output, the minus voltages indicating a 180° phase reversal in applying the direct current to the thin film.

To implement the thin magnetic film elements, in an adaptive array, two embodiments will be described which are typical of logic circuits which may be used to carry out the invention.

Figure 6:
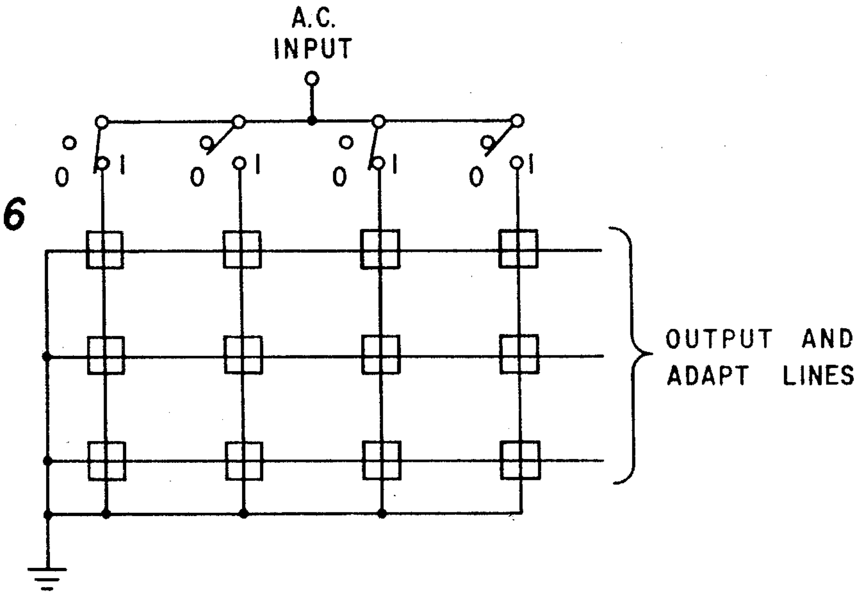
FIGURE 6 illustrates one implementation of thin magnetic films in an adaptive array according to the invention.

The first embodiment, as shown in FIGURE 6, uses Perceptron logic, wherein the input is either 1 or 0. Each gate has four inputs and is capable of a four digit input pattern or binary code. The zero input is obtained by opening a switch from the alternating current source. Each of the inputs may be controlled, by way of example, by a system such as a pattern recognizer or a shift register, neither of which is illustrated. If used with a pattern recognizer, an array of light detectors, each corresponding to one of the illustrated switches, could be used which would either yield a "0" (zero) or "1" (one) output. In the zero position, no A-C current would be supplied to the respective column of thin film as illustrated. In an illustrative operation of the pattern recognizer system, a given pattern might yield a 1–1–0–1 code to the thin film array. The output lines are each fed into a well-known threshold level gate, also not illustrated. The output from each discriminating gate would be zero or one. Thus, the output code might be some combination like 1–1–0. If the output code is desirably some number like 0–1–0, the individual thin films may be pulsed adaptively until the output code then reads 0–1–0. Subsequent to the array adaption thus described, the output will respond to an input code of 1–1–0–1 and yield an output code of 0–1–0. It is to be appreciated that the aforedescribed input and output codes and the circuitry described are merely illustrative of one embodiment according to the invention and are not to be construed in a limiting sense. For example, the number of A-C input and/or output lines could be any number, following the principle that the accuracy of the decisions which can be made by the system increases with the number of adaptive elements which are employed.

Figure 7:
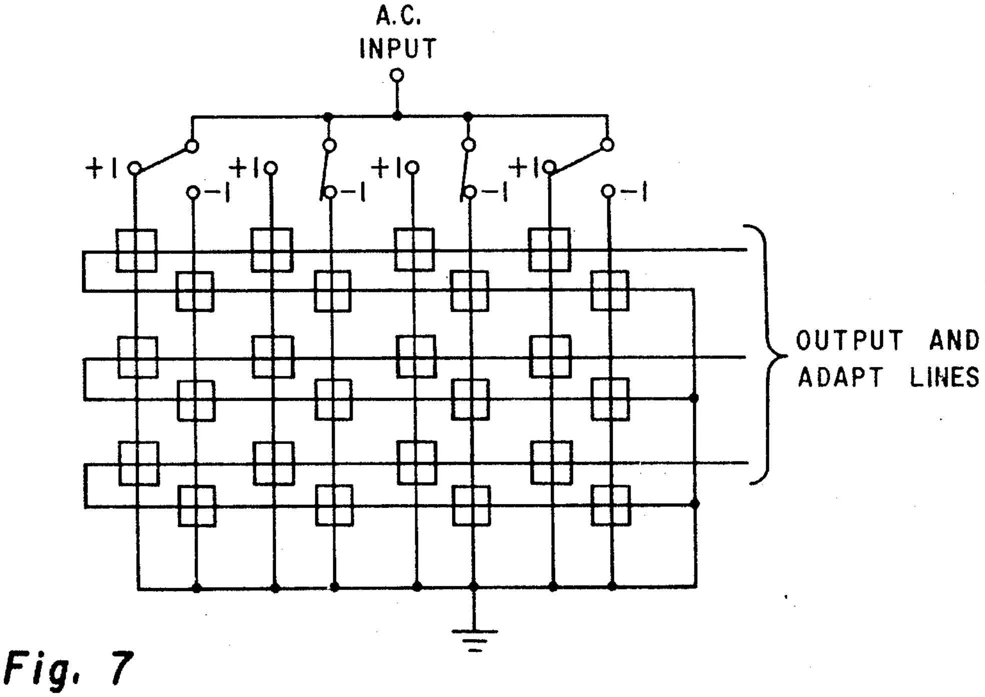
FIGURE 7 illustrates a second implementation of thin magnetic films in an adaptive array according to the invention.

The second embodiment, as illustrated in FIGURE 7, uses Adaline (ADAptive LINEar) logic, wherein the input is either +1 or −1. Since the input to the magnetic thin film adaptive element is an alternating current, the input polarity in this type of logic circuit is determined by the phase relationship between the input and output signals. This is accomplished by controlling the direction in which the output (direct current input) line crosses the thin film. It is readily seen that when one of the A-C switches is in the "+1" position, the output line, with respect to ground potential, will be of one polarity, as contrasted with placing the same switch in the "−1" position, which causes the output polarity to be reversed. This is accomplished by using a different film bit for the "+1" position than when the "−1" position is utilized, and as illustrated, the film bits associated with the "+1" circuitry have a ground potential associated with the left side of the film, whereas the films used with the "−1" position have a ground potential associated with their respective right sides. The polarity arrangement thus described is, however, merely illustrative and the ground potential could be brought in from either side if desired. This circuit, by way of example, also has four inputs and is capable of a four digit input pattern or binary code, but is not to be construed in a limiting sense, as any number of inputs and/or outputs may be used.

As is obvious, the circuit of FIGURE 7 requires twice as many films as does the circuit of FIGURE 6.

It should be appreciated that FIGURES 6 and 7 are merely illustrative of configurations in which thin magnetic films may be used to implement an adaptive trainable system and are not meant to be restrictive. It is to be understood that various changes, substitutions and alterations can be made therein without departing from the spirit and scope of the invention.

What is claimed is:

1. An adaptive trainable device system comprising:
(a) a plurality of thin magnetic films having anisotropy characteristics, each including an easy axis and a hard axis with said plurality of films aligned into at least two groups;
(b) alternating current conducting means running substantially parallel to the respective easy axis of said films in spaced relation to said films;
(c) direct current conducting means running substantially parallel to the respective hard axis of said films in spaced relation to said films;
(d) means for selectively applying an alternating current to said alternating current conducting means;
(e) means for applying a direct current to said direct current conducting means whereby the net magnetization of said films are adaptively trained; and
(f) means for measuring a parameter proportional to the net magnetization of said film.

2. The system according to claim 1 wherein said films are so aligned that said means for selectively applying an alternating current comprises an alternating current source and a plurality of switches between said source and said films, whereby each of said switches determines whether one or more of said films is electrically connected to said alternating current source.

3. The system according to claim 2 wherein said films are so aligned that when one group of said films are connected to said source, the films of said group each have said direct current traversing its respective hard axis in one direction, whereas when a second group of said films are connected to said source, the films of said second group each have said direct current traversing its respective hard axis in a second direction.

References Cited

UNITED STATES PATENTS

| | | | |
|---|---|---|---|
| 3,276,001 | 9/1966 | Crafts | 340—174 |
| 3,346,854 | 10/1967 | Crafts et al. | 340—174 |

FOREIGN PATENTS

| | | |
|---|---|---|
| 1,134,414 | 8/1962 | Germany. |

OTHER REFERENCES

Hoper: Journal of Applied Physics, vol. 35, No. 3, pp. 762–763, March 1964.

BERNARD A. KONICK, Primary Examiner

B. L. HALEY, Assistant Examiner

U.S. Cl. X.R.

307—88